(12) United States Patent
Gogolla et al.

(10) Patent No.: US 7,456,936 B2
(45) Date of Patent: Nov. 25, 2008

(54) ELECTRO-OPTICAL HAND-HELD DISTANCE MEASURING INSTRUMENT

(75) Inventors: Torsten Gogolla, Schaan (LI); Armin Spiegel, Berneck (CH); Andreas Winter, Feldkirch (AT); Helmut Seifert, Serba (DE); Heinz Kousek, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 595 days.

(21) Appl. No.: 10/840,159

(22) Filed: May 6, 2004

(65) Prior Publication Data

US 2004/0223164 A1    Nov. 11, 2004

(30) Foreign Application Priority Data

May 9, 2003   (DE) ................. 103 20 790

(51) Int. Cl.
    *G01C 3/08*   (2006.01)
(52) U.S. Cl. .............................. 356/4.01; 356/5.01
(58) Field of Classification Search ........ 356/4.01–5.15
    See application file for complete search history.

(56) References Cited

U.S. PATENT DOCUMENTS

| | | | | |
|---|---|---|---|---|
| 4,730,190 A | * | 3/1988 | Win et al. ................. | 342/118 |
| 5,433,014 A | * | 7/1995 | Falk et al. ................. | 33/763 |
| 5,713,135 A | * | 2/1998 | Acopulos ................... | 33/451 |
| 5,806,020 A | * | 9/1998 | Zykan ....................... | 702/159 |
| 5,894,675 A | * | 4/1999 | Cericola .................... | 33/451 |
| 6,928,029 B2 | * | 8/2005 | Rickman .................... | 367/99 |
| 7,053,992 B2 | * | 5/2006 | LaBelle et al. ............. | 356/6 |
| 7,125,145 B2 | * | 10/2006 | Gardiner et al. ........... | 362/253 |
| 2002/0193964 A1 | * | 12/2002 | Hsu .......................... | 702/161 |

FOREIGN PATENT DOCUMENTS

| | | |
|---|---|---|
| DE | 9718642 | 9/1997 |
| DE | 19836812 A1 * | 2/2000 |
| DE | 19916409 A1 * | 10/2002 |
| EP | 0828165 | 3/1998 |

* cited by examiner

*Primary Examiner*—Isam Alsomiri
(74) *Attorney, Agent, or Firm*—Abelman, Frayne & Schwab

(57) ABSTRACT

An electro-optical hand-held distance measuring instrument (1) with a housing (2) which can be held in the hand and with an electro-optical distance measurement module (3) with an electric beam source (5) for generating an optical measurement beam (S), a beam receiver (8) for receiving portions of the measurement beam (S) that are backscattered by an object to be measured (MO), and an output device (7) for the determined distance (X). A mechanical distance measuring device (9, 11) is connected to the housing (2).

20 Claims, 2 Drawing Sheets

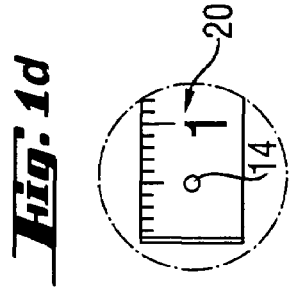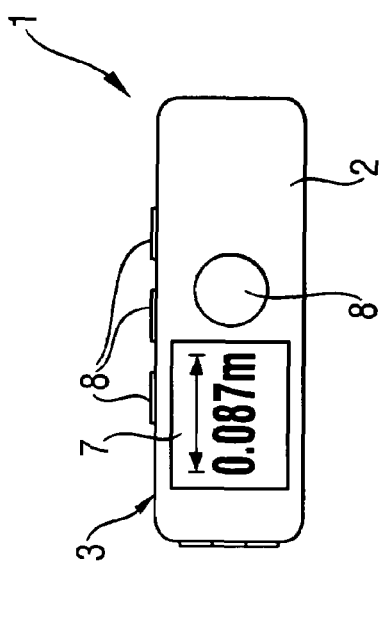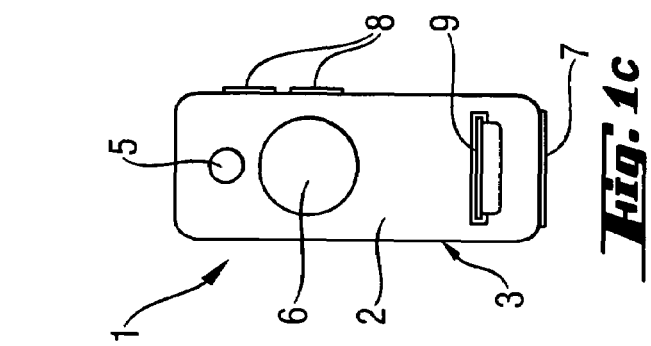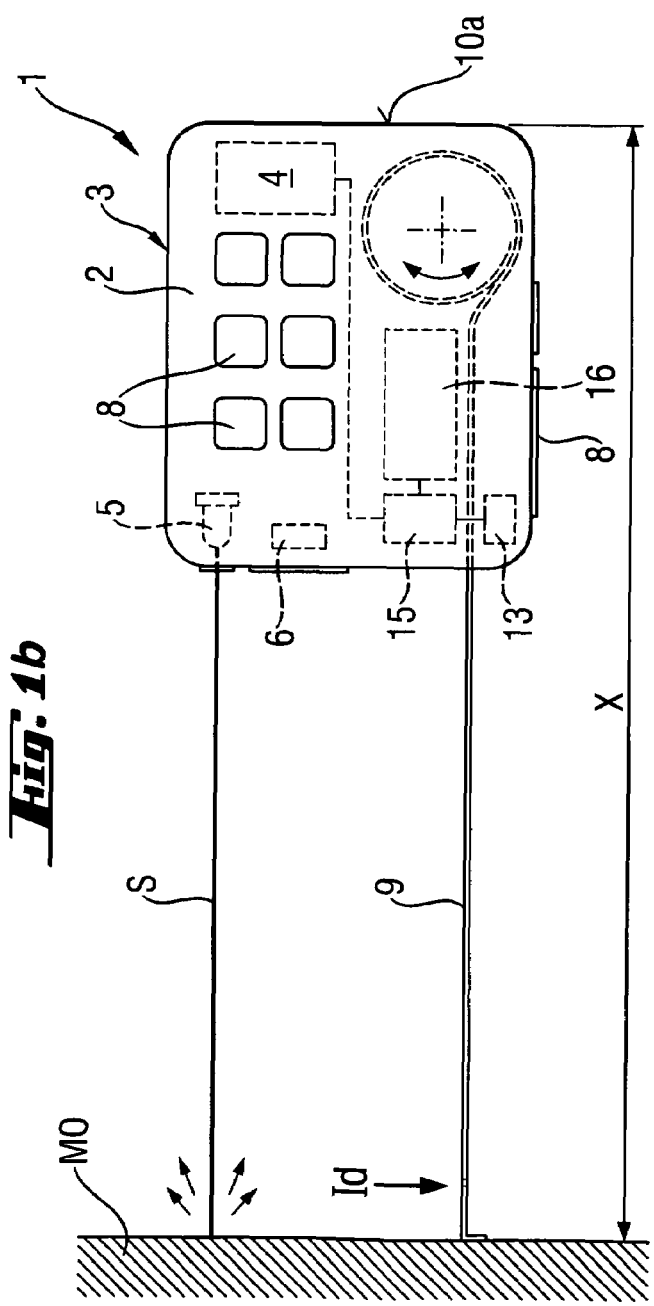

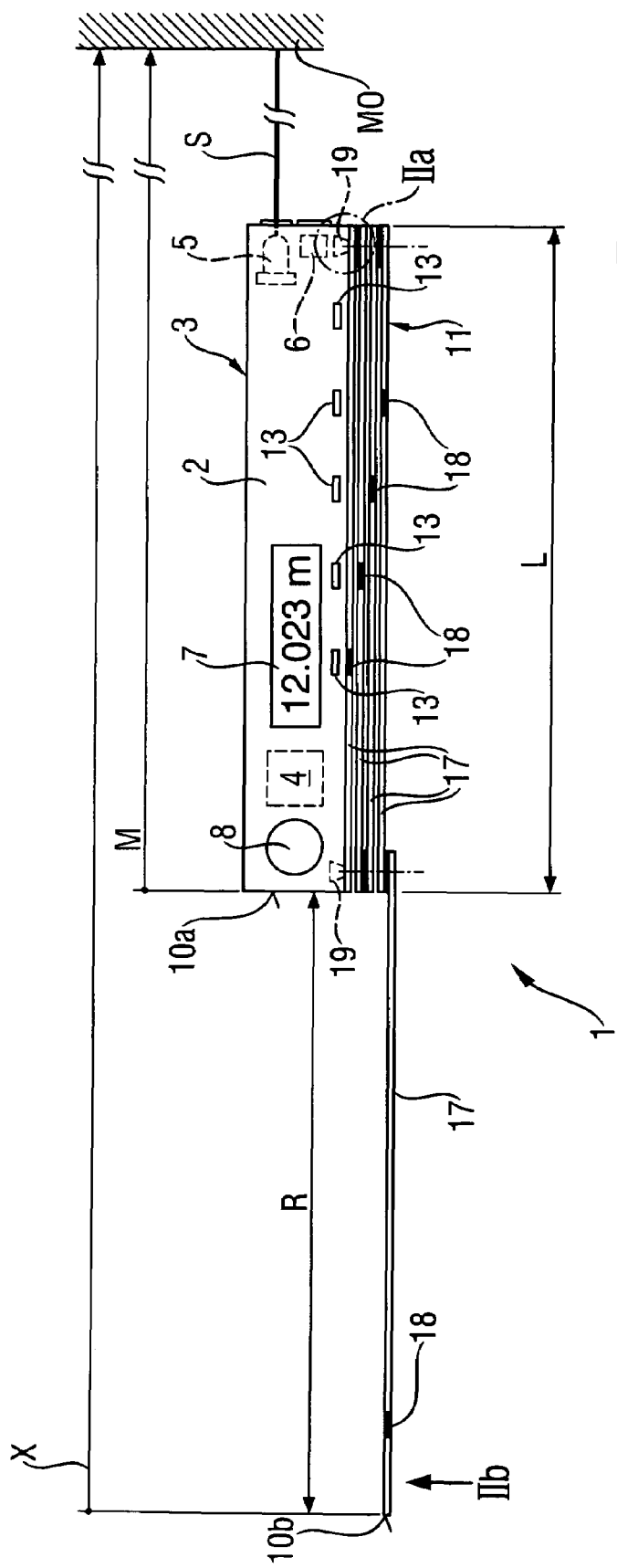
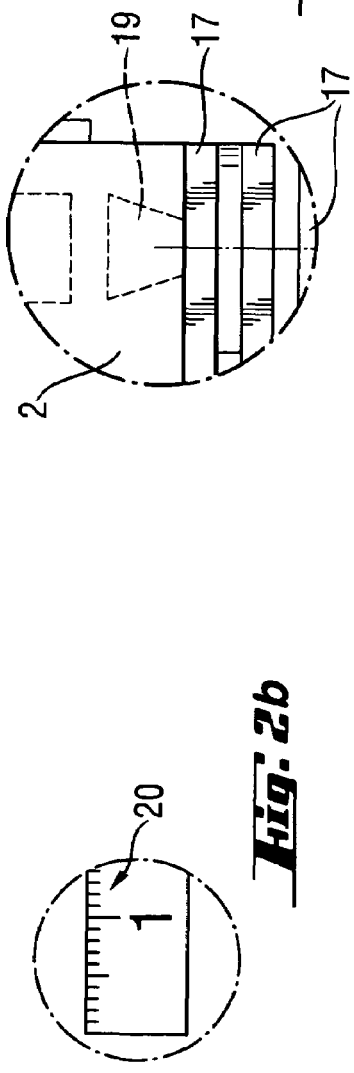
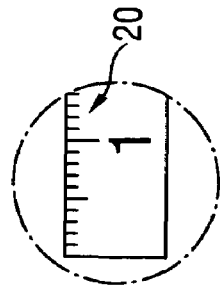

ELECTRO-OPTICAL HAND-HELD DISTANCE MEASURING INSTRUMENT

BACKGROUND OF THE INVENTION

The invention is directed to an electro-optical hand-held distance measuring instrument with a modulated laser measurement beam.

In the construction or building industry, it is necessary to determine distances up to several hundred meters with an accuracy of within a few millimeters. In order to measure distance, the hand-held distance measuring laser devices designed for this purpose generally use a method which measures the difference in phase velocity of a modulated visible laser beam as a means for optical distance measurement in that a measurement beam, preferably the visible laser beam of a laser diode, which is bundled by collimating optics is directed to the surface of an object to be measured. The optical radiation which is backscattered or reflected by the light spot of the measurement beam that is positioned on the object to be measured is focused on the active surface of a measuring photodetector by a reception lens. For distance measurement, the measurement beam of the laser diode is generally modulated in intensity, i.e., a measurement signal is superimposed on the light beam. The signal transit time (or signal phase shift) from the optical transmitter through the measurement object to the detector is determined by an evaluating unit from the signal, which is backscattered or reflected by the measurement object received by the measurement photodetector and processed by the receiver electronics. Finally, the measured distance is given by the signal transit time and the light velocity. Distance measurement always requires an opposite surface, which is usually not available in the building industry when measuring or breaking down into lengths in the plane of walls or floors.

According to DE19836812A1, an electro-optical hand-held distance measuring instrument has a housing which can be held in the hand and an electro-optical distance measurement module with an electric beam source for generating an optical measurement beam, a beam receiver, a display, and an operator control. In addition, aside from simple measurement of distance, it has several additional calculation functions such as measurement of surfaces and volumes and the addition and subtraction of distances. Very short distances from 0 to 20 cm cannot be measured directly due to the length of the housing of the electro-optical hand-held distance measuring instrument extending in front in the measurement beam direction. These electro-optical hand-held distance measuring instruments are not always available to the user particularly in the building industry, but are generally only brought along for special tasks that have been planned in advance.

In order to measure distances from 0 to 2 m, a mechanical distance measuring device with an optically readable measurement scale is generally used. Further, mechanical distance measuring devices such as the measuring tape and folding measuring ruler are small, handy and do not require a target surface. Generally, distances of up to 5 m are measured with measuring tape. The folding ruler (measuring stick, double meter, meter rod), an obligatory accouterment of special groups of professionals in the building industry that is always on hand when distance is to be measured, is a particularly popular and indispensable tool of long standing especially when measuring arms-length distances due to the fact that measurements can be carried out simply and quickly. In addition, it is easy to make marks on walls and floors and to measure or plot virtual structural component parts (in the air, as it were). With mechanical instruments for measuring distance, subjective reading errors which are caused by objective soiling of the measurement scale or faulty counting depending on the viewing angle occur as absolute measurement errors. At distances of several meters, distance-dependent measurement errors result in particular from a poorly defined placement or measurement point, slack or sagging in the distance measuring device, pushing or pulling forces, as well as aging, moisture and thermal expansion of the distance measuring device. The accuracy of a distance measurement of within a few millimeters, which is at least occasionally necessary in the building industry is not ensured with the mechanical distance measuring devices that are generally all that is available.

According to DE 19916409, a folding measurement rod comprises ten elongated, inherently rigid members with a length of up to 23 cm, which are connected to one another in a lockable manner to be rotationally swivelable alternately at their respective ends. At least one optically readable measurement scale for distances extends along an area, which swivels out along a line. This measurement scale usually is divided into millimeters or inches and arranged on a front end of the folding measurement rod designed as a reference point and beginning with zero.

According to U.S. Pat. No. 5,713,135, U.S. Pat. No. 5,894,675, various mechanical measuring gauges for the building industry are combined with a laser pointer for exact positioning. According to US20020193964, a hand-held distance measuring instrument has a measuring tape which is coiled up in a housing that can be held in the hand for measuring distances and a laser pointer as optical pointer. The laser beam is not designed as a measurement beam. In addition, there are no reception optics.

SUMMARY OF THE INVENTION

It is the object of the invention to realize a hand-held distance measuring instrument which is sufficiently accurate over large distances and does not require any target surfaces when measuring short distances. Another object is the realization of a practical hand-held distance measuring instrument which can be used in an all-purpose manner for a wide variety of tasks, particularly in the building industry.

This object is met according to the invention by an electro-optical hand-held distance measuring instrument having a housing which can be held in the hand and an electro-optical distance measurement module with an electric beam source for generating an optical measurement beam, a beam receiver for receiving portions of the measurement beam that are backscattered by an object to be measured, and an output device for the determined distance, wherein mechanical means for distance measurement are also connected to the housing.

The suitable distance measuring device can be selected depending upon the task at hand by combining in a combination hand-held distance measuring instrument an electro-optical hand-held distance measuring instrument with a conventional, all-purpose mechanical distance measuring device by which routine operations can be carried out in an accustomed and proven manner. In addition to distance measurements from zero without an opposite surface in near range, distance measurement can now be carried out in the far range with the required accuracy with a hand-held distance measuring instrument at any time for unforeseeable measurement tasks particularly in the building industry with the mechanical distance measuring device, which is virtually an obligatory user tool.

The hand-held distance measuring instrument advantageously has a connection element which forms a manually detachable interface to the mechanical distance measuring device, which interface can optionally snap in, so that the mechanical distance measuring device can be detached from the hand-held distance measuring instrument as an independent module for temporary auxiliary tasks.

The hand-held distance measuring instrument advantageously has an externally accessible operator control, which can optionally be a press button, for activating the optical measurement beam and triggering the optical distance measurement process so that the optical measurement of distance can be activated manually in a simple manner.

The electro-optical distance measurement module advantageously has additional calculation functions, including the addition of distances, and optionally the subtraction of distances and the calculation of surfaces and volumes, so that complex measurement tasks can be solved by reference distances or multiple measurements.

The hand-held distance measuring instrument advantageously has a first common reference point for measuring distances with the mechanical distance measuring device or, in the form of the measurement beam, with the optical distance measuring device, so that both distance measurement variants are possible without changing the position of the hand-held distance measuring instrument.

The hand-held distance measuring instrument advantageously has a control device which is connected with the mechanical distance measuring device and which is internal and connected to the electro-optical distance measurement module in a controllable manner so that the electro-optical distance measurement module is controllable by the mechanical distance measuring device.

The control device is advantageously constructed as a contactless sensor, and optionally as a Hall sensor or photodetector, which senses the relative position of the housing and mechanical distance measuring device having the second reference point and which is sensitive to permanent magnets or optically transparent holes arranged in the mechanical distance measuring device so that the control device is more dependable, less sensitive to dirt and more resistant to wear than a mechanically contacting control device.

The end of the mechanical distance measuring device whose length is changeable with respect to the housing constitutes a second reference point whose reference distance to the first reference point from the hand-held distance measuring instrument can be detected by the control device so that this reference distance is known to the electro-optical distance measurement module, particularly to an integrated microcontroller.

The distance determined by the computing device is advantageously dependent on the reference distance so that the reference distance can be added to the light measurement distance.

When positioning the second reference point on the floor and handling the hand-held distance measuring instrument at chest level, a particularly ergonomic use is made possible.

The control device is advantageously connected to a switching device for a current-carrying connection of the electro-optical distance measurement module to a power supply. The switching device is closed to conduct current exclusively when the mechanical distance measuring device is in a position relative to the housing that is necessary for mechanical distance measurement so that the hand-held distance measuring instrument is ready for optical distance measurement only when the mechanical distance measuring device is intuitively activated corresponding to the task at hand to prevent unintentional distance measurements which drain the power source prematurely.

The mechanical distance measuring device is advantageously a measuring tape and a self-stiffening, spring pretensioned steel measuring tape so that it can be lengthened continuously and can be coiled up inside the housing of the hand-held distance measuring instrument within a very compact space.

Alternatively, the mechanical distance measuring device is a folding measurement rod or folding rule so that the mechanical distance measuring device is constructed in the form of an inherently rigid rule which can be lengthened section by section and which can be freely oriented in space with one hand. In addition, measurements such as the depth of bore holes can be carried out in inaccessible locations simply by inserting the measurement rule.

The folding rule advantageously has a plurality of 5 to 15 and optimally 10, elongated inherently rigid members which can be connected with one another in an alternate rotational swivelable by their respective ends to be lockable, the length of the members being between 10 cm and 30 cm, optimally 23 cm, so that the user is familiar with the length and zoom factor by a conventional folding rule.

BRIEF DESCRIPTION OF THE INVENTION

The invention will be described more fully with reference to the drawings wherein:

FIGS. 1a-1c show an electro-optical hand-held distance measuring instrument in three projections according to the invention;

FIG. 1d shows an enlarged partial view according to arrow Id in FIG. 1b;

FIG. 2 shows a variant embodiment according to the invention;

FIG. 2a shows a partial enlargement according to circle section IIa in FIG. 2; and FIG. 2b shows an enlarged partial view according to arrow IIb in FIG. 2.

DETAILED DESCRIPTION OF THE INVENTION

According to FIGS. 1a-1c, which show three Cartesian projections, an electro-optical hand-held distance measuring instrument 1 has a housing 2 which can be held in the hand and an electro-optical distance measurement module 3. The distance measurement module 3 has a computing device 4 in the form of an embedded microcontroller, an electric beam source 5 in the form of a laser diode with collimating optics generating an optical measurement beam S, an identically oriented beam receiver 6, an output device 7 in the form of an alphanumeric display for the distance X determined by the microcontroller 4, and externally accessible operator controls 8 in the form of a press button for distance measurement and additional function buttons for special functions of the computing means 4 for adding and subtracting distances and for calculating surfaces and volumes. In addition, a coiled measuring tape 9 which is made of self-stiffening, spring pretensioned steel and which can be pulled out in the radiating direction of the optical measurement beam S is arranged in the housing 2. In order to measure distance by an optically readable measurement scale 20 on the measuring tape 9 or by the optical measurement beam 5, the opposite side of the hand-held distance measuring instrument 1 forms a common first reference point 10a. A control device 13 which is arranged internally in the hand-held distance measuring instrument 1 in the form of a photodetector which senses a hole 14 arranged at the front end of the measuring tape 9 is connected to a switching device 15 constructed as an electronic switch. This switching device 15 produces a current-conducting connection between the electro-optical distance measurement module 3 and a power supply 16 in the form of a battery only when a measuring tape 9 is intuitively pulled out somewhat for measuring distance.

According to FIG. 2, the housing 2 which can be held in the hand is connected flush with a folding rule 11 with five inherently rigid, rotational swivelable members 17 and a folded up length L of 23 cm. The hand-held distance measuring instrument 1 has an internal control device 13 in the form of five longitudinally spaced Hall sensors which control the electro-optical distance measurement module 3 in a non-contacting manner since they sense permanent magnets 18 which are accommodated in the folding rule 11 at different positions in different members 17. The computing device 4 in the form of the microcontroller calculates a reference distance R from the first reference point 10a to the second reference point 10b in that the computing device 4 detects the quantity of swiveled out members 17 whose front end forms a second reference point 10b. When a distance X is determined proceeding from the second reference point 10b, this reference distance R is added to a light measurement distance M which is measured from the optical measurement beam S in the opposite direction. The hand-held distance measuring instrument 1 has a connection element 19 in the form of a dovetail guide (FIG. 2a) which can snap in transversely and which forms a manually detachable interface to the modular independent folding rule 11 which is formed with an associated dovetail and which has an optically readable measurement scale 20.

What is claimed is:

1. An electro-optical hand-held distance measuring instrument comprising:
   a housing (2) that can be held in the hand,
   an electro-optical distance measurement module (3) with an electric beam source (5) for generating an optical measurement beam (S),
   a beam receiver (8) for receiving portions of the measurement beam (S) that are backscattered by an object to be measured (MO), and an output device (7) for the determined distance (X), and
   a mechanical distance measuring device (9,11) usable for a steady measurement of distances, wherein the mechanical distance measuring device (9, 11) is connected to the housing (2) and includes an optically readable measurement scale (20),
   wherein the electro-optical distance measurement module (3) has a control device (13) constructed as at least one contactless sensor that is connected with the mechanical distance measuring device (9, 11) and that is connected to the electro-optical distance measurement module (3) in a controllable manner; and
   wherein the at least one contactless sensor senses the position of the mechanical distance measuring device (9, 11) relative to the housing (2) and that is sensitive to one of a permanent magnet and a transparent hole (14) arranged in the mechanical distance measuring device (9, 11).

2. The hand-held distance measuring instrument of claim 1, wherein a connection element (19) is provided that forms a manually detachable interface to the mechanical distance measuring device (9, 11).

3. The hand-held distance measuring instrument of claim 1, further comprising an externally accessible operator control (8) for activating the optical measurement beam (S) and triggering the optical distance measurement process.

4. The hand-held distance measuring instrument of claim 3, wherein the externally accessible operator control (8) is a press button.

5. The hand-held distance measuring instrument of claim 1, wherein the electro-optical distance measurement module (3) has a computing device (4) with additional calculation functions including the addition of distances.

6. The hand-held distance measuring instrument of claim 5, wherein the additional calculation functions further include at least one of the subtraction of distances and the calculation of surfaces and volumes.

7. The hand-held distance measuring instrument of claim 1, wherein the electro-optical distance measurement module (3) has a common first reference point (10a) for measuring the distance (X) with the mechanical distance measuring device (9, 11) and with the optical measurement beam (S).

8. The hand-held distance measuring instrument of claim 1, wherein the mechanical distance measuring device is a measuring tape (9).

9. The hand-held distance measuring instrument of claim 8, wherein the measuring tape (9) is a self-stiffening, spring pretensioned steel measuring tape.

10. The hand-held distance measuring instrument of claim 1, wherein the mechanical distance measuring device is a folding rule (11).

11. The hand-held distance measuring instrument of claim 10, wherein the folding rule (11) has between 5 and 15 rotationally swivelable members (17) with a length (L) between 10 cm and 30 cm.

12. The hand-held distance measuring instrument of claim 1, wherein the at least one contactless sensor is one of a Hall sensor and a photodetector.

13. An electro-optical hand-held distance measuring instrument comprising:
   a housing (2) that can be held in the hand,
   an electro-optical distance measurement module (3) with an electric beam source (5) for generating an optical measurement beam (S),
   a beam receiver (8) for receiving portions of the measurement beam (S) that are backscattered by an object to be measured (MO), and an output device (7) for the determined distance (X), and
   a mechanical distance measuring device (9,11) usable for a steady measurement of distances, wherein the mechanical distance measuring device (9, 11) is connected to the housing (2) and includes an optically readable measurement scale (20),
   wherein the electro-optical distance measurement module (3) has a control device (13) constructed as at least one contactless sensor that is connected with the mechanical distance measuring device (9, 11) and that is connected to the electro-optical distance measurement module (3) in a controllable manner; and
   wherein the end of the mechanical distance measuring device (9, 11) whose length is changeable with respect to the housing (2) constitutes a second reference point (10b) whose reference distance (R) to the first reference point (10a) can be detected by the computing device (4) by the control device (13).

14. The hand-held distance measuring instrument of claim 13, wherein the distance (X) determined by the computing device (4) is dependent on the reference distance (R).

15. An electro-optical hand-held distance measuring instrument comprising:
   a housing (2) that can be held in the hand, an electro-optical distance measurement module (3) with an electric beam source (5) for generating an optical measurement beam (S), a beam receiver (8) for receiving portions of the measurement beam (S) that are backscattered by an object to be measured (MO), and an output device (7) for the determined distance (X), and a mechanical distance measuring device (9,11) usable for a steady measurement of distances, wherein the mechanical distance measuring device (9, 11) is connected to the housing (2) and includes an optically readable measurement scale (20), wherein the electro-optical distance measurement module (3) has a control device (13) constructed as at least one contactless sensor that is connected with the mechanical distance measuring device (9, 11) and that is connected to the electro-optical distance measurement module (3) in a controllable manner; and wherein the control device (13) is connected to a switching device (15) for a current-carrying connection of the electro-optical distance measurement module (3) to a power supply (16), wherein the switching device (15) is closed to conduct current exclusively when the mechanical distance measuring device (9, 11) is in a position relative to the housing (2) that is necessary for mechanical distance measurement.

16. An electro-optical hand-held distance measuring instrument comprising:

a housing that can be held in the hand;

an electro-optical distance measurement module with an electric beam source for generating an optical measurement beam;

a beam receiver for receiving portions of the measurement beam that are backscattered by an object to be measured, and an output device for the determined distance; and a mechanical distance measuring device usable for a steady measurement of distances, wherein the mechanical distance measuring device is connected to the housing and includes an optically readable measurement scale;

wherein the electro-optical distance measurement module has a control device that is connected with the mechanical distance measuring device and that is connected to the electro-optical distance measurement module in a controllable manner; and wherein the control device is constructed as at least one contactless sensor that senses the position of the mechanical distance measuring device relative to the housing and that is sensitive to one of a permanent magnet and a transparent hole arranged in the mechanical distance measuring device.

17. The hand-held distance measuring instrument of claim 16, wherein the at least one contactless sensor is one of a Hall sensor and a photodetector.

18. An electro-optical hand-held distance measuring instrument comprising:

a housing that can be held in the hand;

an electro-optical distance measurement module with an electric beam source for generating an optical measurement beam;

a beam receiver for receiving portions of the measurement beam that are backscattered by an object to be measured, and an output device for the determined distance; and a mechanical distance measuring device usable for a steady measurement of distances, wherein the mechanical distance measuring device is connected to the housing and includes an optically readable measurement scale;

wherein the electro-optical distance measurement module has a control device that is connected with the mechanical distance measuring device and that is connected to the electro-optical distance measurement module in a controllable manner;

wherein the end of the mechanical distance measuring device whose length is changeable with respect to the housing constitutes a second reference point whose reference distance to the first reference point can be detected by the computing device by the control device.

19. The hand-held distance measuring instrument of claim 18, wherein the distance determined by the computing device is dependent on the reference distance.

20. An electro-optical hand-held distance measuring instrument comprising:

a housing that can be held in the hand;

an electro-optical distance measurement module with an electric beam source for generating an optical measurement beam;

a beam receiver for receiving portions of the measurement beam that are backscattered by an object to be measured, and an output device for the determined distance; and a mechanical distance measuring device usable for a steady measurement of distances, wherein the mechanical distance measuring device is connected to the housing and includes an optically readable measurement scale;

wherein the electro-optical distance measurement module has a control device that is connected with the mechanical distance measuring device and that is connected to the electro-optical distance measurement module in a controllable manner; and wherein the control device is connected to a switching device for a current-carrying connection of the electro-optical distance measurement module to a power supply, wherein the switching device is closed to conduct current exclusively when the mechanical distance measuring device is in a position relative to the housing that is necessary for mechanical distance measurement.

* * * * *